F. H. LORING.
PROCESS FOR THE TREATMENT OF FLOUR, SEMOLINA, AND THE LIKE.
APPLICATION FILED APR. 8, 1912.
1,032,224.
Patented July 9, 1912.
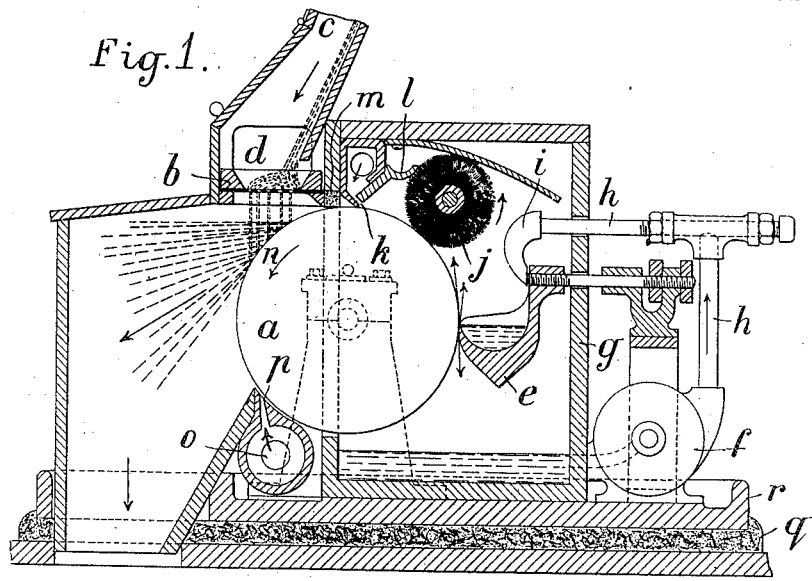
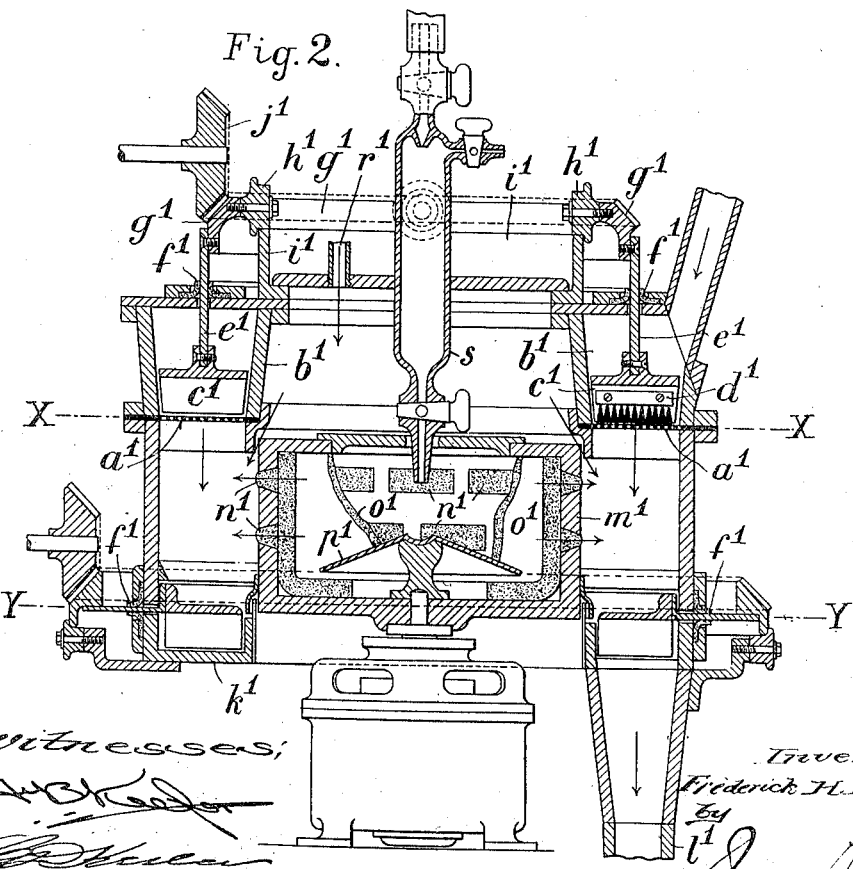

UNITED STATES PATENT OFFICE.

FREDERICK HENRY LORING, OF LONDON, ENGLAND.

PROCESS FOR THE TREATMENT OF FLOUR, SEMOLINA, AND THE LIKE.

1,032,224.  Specification of Letters Patent.  Patented July 9, 1912.

Application filed April 8, 1912. Serial No. 689,399.

*To all whom it may concern:*

Be it known that I, FREDERICK HENRY LORING, a citizen of the United States, residing at London, England, have invented a new and useful Process for the Treatment of Flour, Semolina, and the Like, of which the following is a specification.

My invention relates to the treatment of flour, semolina and the like, for bringing about an improvement in the bread made from the finished product.

In the treatment of flour it is highly desirable that the liquids should be applied as cold as possible and without too much accompanying air, especially in foggy weather, owing to the soiling action of soot particles often held in suspension in the foggy atmosphere of smoky cities. For this purpose, according to my said invention, the material is caused to pass in a shower through a gaseous medium containing liquid in a very finely divided state, such gas and liquid being maintained at a low temperature, for example, substantially zero centigrade, so that in cases where the freezing point of the liquid lies at or near this temperature, the flour passes through an atmosphere containing particles of frozen liquid. The said liquid is preferably brought into the state of fine division without the use of an air-jet, for which purpose it is projected by centrifugal force from the surface of a body rotating at a high speed. The liquid may be kept cool by its evaporation, or by the application of a cooling agent, such as air from a refrigerating plant.

In the accompanying drawings, I have shown apparatus suitable for carrying my said invention into practice.

In these drawings:—Figure 1 shows one form of apparatus in central vertical section, and Fig. 2 is a similar view illustrating a modified construction.

The apparatus shown in Fig. 1, which is intended for the treatment of semolina only, comprises a rotating hollow cylinder $a$, which is constructed of suitable nonoxidizing material and arranged to be driven at a high speed, for example, at a peripheral speed of 3 miles per minute. The semolina is brought into contact with the cylinder by a shaking sieve $b$, the semolina being delivered thereto through the spout $c$. An overflow at $d$ is provided, so that an excess of semolina would fall over and prevent the machine "blocking". The cylinder is moistened by the trough $e$ shown in cross-section, which is fed by means of a suitable pump $f$, that draws its supply from the reservoir $g$ and delivers it through pipes $h$, $h$ and an elongated nozzle $i$. The liquid flows over the lip of the trough $e$ and some excess is thrown off from the cylinder, as indicated by the tangent arrows. The fine bristle-brush $j$ is driven independently in the direction indicated, and removes a further excess of liquid. Behind the brush is an elongated air-nozzle $k$, which equalizes the film and removes droplets. Some of the thrown-off liquid is caught in the elongated cup $l$. The roller has now a moist film on it, as it passes under a stationary or traveling band of rubber $m$, which catches any spray that may form into drops and unduly moisten the semolina. The semolina is thrown off the cylinder at $n$, having been slightly moistened by contact with the wet cylinder revolving in the direction indicated. To prevent any flour, which always accompanies the semolina to a slight extent, from being carried into the part of the machine where the liquid is applied to the cylinder, an elongated nozzle $o$ is provided. Only a gentle blast of air issues from the slot $p$. A concrete or rubber foundation $q$ is provided for the cast-iron base-plate $r$ of the machine. It will be seen that the semolina comes into contact with a cool surface, and the atmosphere surrounding the machine is cooled by evaporation of the liquid therefrom.

Fig. 2 shows a modified construction applicable for the treatment of both semolina and flour, wherein the semolina (or flour) is allowed to fall in close proximity to the wet cylinder, but not in direct contact therewith. In this case a cylinder $m'$ is mounted on a vertical axis, although obviously, such mounting is not necessary to the invention, and the liquid fed on the inside. It will be apparent that the two designs, although quite different in appearance, are capable of being operated in the same way, and involve the same principle in dealing with the liquids by means of centrifugal force.

Instead of a shaking sieve, as in Fig. 1, the flour or semolina is caused to descend through a sieve $a'$ forming the bottom of a circular trough $b'$. Revolving sweepers (blades) and brushes $c'$ and $d'$ respectively, insure a thorough passage and a good distribution of the material. The mechanical arrangements are shown in some detail, but they may be modified considerably. The blades are supported by a tubular part $e'$ with dust-tight joints $f'$, the former in turn being fastened to a bevel gear-wheel $g'$ supported by flanged wheels $h'$ running on a circular track $i'$ and driven by a smaller bevel-gear $j'$. A similar arrangement delivers the material from a circular trough $k'$ into the exit spout $l'$. The cylinder $m'$ is provided with perforations or rectangular openings into which felt or suitable porous plugs or pads $n'$ are fitted. These plugs or pads are so made as to retain their shape when subjected to considerable centrifugal force. Water is supplied to the interior of the cylinder $m'$ by a spout $s$. Additional absorbent material $o'$ is inserted and the liquid descends on the scattering plate $p'$. The liquid is thrown out, in the directions indicated by the arrows, in the form of a vapor, mist or fine rain. In order to get quickly at the cylinder $m'$ as well as at other parts of the machine, the different sections of the latter are made separable along the planes X—X and Y—Y, the said sections being supported externally by a cast-iron frame, not shown.

Inasmuch as both of the above machines operate as cooling devices, owing to the lowering of the temperature due to the excessive evaporation, further cooling of the solutions is not always necessary, but the application of artificial cold to the solutions or the products thrown off by centrifugal force, may be resorted to in some cases with considerable advantage. Even the flour or semolina may be cooled by the direct application of cold air or chilled surfaces in a suitable agitator, or other machine, in which the flour or like material tumbles about.

Cold air can be introduced into the centrifugal machines, preferably through the pipe $r'$, Fig. 2, or nozzle $o$, Fig. 1. In some cases fine snow is produced, which passing into the flour assists in cooling it.

It is a matter of experiment for the miller to determine the quantities of any liquid or reagent desirable in a given batch of flour, and the extent to which the cooling of the products should be carried is also best determined by the usual tests on the finished flour.

What I claim is:

1. A process for the treatment of cereal milling products, consisting in allowing the material to pass in the form of a shower through a gaseous medium containing liquid in a very finely divided state, such gas and liquid being maintained at a temperature of substantially zero centigrade.

2. A process for the treatment of cereal milling products wherein the material to be treated is caused to pass in the form of a shower through an atmosphere containing particles of frozen liquid.

FREDERICK HENRY LORING.

Witnesses:
  GEORGE HARRISON,
  ALEXANDER WILLIAM ALLEN.